Patented Dec. 17, 1940

2,225,544

UNITED STATES PATENT OFFICE 2,225,544

MANUFACTURE OF ALKYLATED ISO-PARAFFINIC HYDROCARBONS

Arthur L. Blount, Palos Verdes Estates, Calif., assignor to Union Oil Company of California, Los Angeles, Calif., a corporation of California No Drawing. Application May 14, 1938,
Serial No. 208,059

15 Claims. (Cl. 196—10)

The present invention relates to the treatment of hydrocarbons and refers to the manufacture of paraffinic or saturated hydrocarbons of the branched chain type, especially suitable for use in automobile and aviation engines. In a more specific sense the invention comprises a process for the combining of isoparaffinic hydrocarbons of relatively low molecular weights with olefinic hydrocarbons to produce branched chain paraffinic hydrocarbons of higher molecular weights and boiling within the gasoline range. These products of reaction are of particular value as motor fuels or constituents thereof in that they possess high anti-detonating characteristics. The invention further comprises the use of special catalyzing mixtures and conditions of operation for the manufacture of these valuable compounds.

It has been recently proposed to produce branched chain hydrocarbon fractions boiling within the gasoline range and having high anti-detonating characteristics by alkylating certain isoparaffinic hydrocarbons with olefins. This alkylation reaction was found to occur when the isoparaffinic hydrocarbons were brought into contact with the olefins in the presence of an alkylating catalyst, such as sulfuric acid. The reaction between the olefinic molecule and the isoparaffinic molecule produces a branched chain paraffinic molecule. This reaction is called "alkylation" and the product of the reaction is termed an "alkymer" in order to distinguish it from a "polymer" which is the product resulting from the interaction of two or more olefin molecules.

Theoretically, the reaction between an isoparaffinic molecule and an olefinic molecule in the presence of a suitable alkylating catalyst is of a simple character. Thus, the combination which takes place when isobutane is chemically combined with a butene may be expressed by the following equation:

$$C_4H_{10} + C_4H_8 \rightarrow C_8H_{18}$$

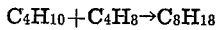

The above equation thus shows the union of one molecule of isobutane with one molecule of a butene to produce one molecule of an octane. Similar reaction equations may be written for the above or other isoparaffins with various olefins. However, as will be brought out more fully hereinbelow the term "alkylation" as employed herein includes not only the simple chemical combination of the isoparaffinic molecules with the olefinic molecules introduced into the sphere of reaction, but also a reaction in which the union between the isoparaffinic and olefinic molecules is either preceded or succeeded by a scission of the hydrocarbon molecules.

The above described alkylation reaction may be realized by reacting the isoparaffinic and olefinic hydrocarbons in the presence of suitable alkylating catalysts, such as sulfuric acid and particularly strong sulfuric acid. The stronger sulfuric acid catalysts, maintaining other conditions equal, increase the yields of the desirable branched chain paraffinic hydrocarbons boiling within the gasoline range. The use of these stronger acid catalysts further decreases the production of polymers within the gasoline range. However, sulfuric acids of these higher strengths, when brought into contact with the described hydrocarbons, tend to react therewith to produce certain undesirable side reactions with the incidental formation of sulphur dioxide, carbonization products and some water. The formation of this water is undesirable in that it dilutes the sulfuric acid catalyst and unites with the sulfuric acid molecules to produce monohydrates. This gradual dilution and formation of monohydrates progressively lowers the alkylating activity of the sulfuric acid.

It is, therefore, the main object of the present invention to obviate the above and other defects and to provide a process for the alkylation of the isoparaffinic hydrocarbons with olefinic hydrocarbons in which the alkylating life of the catalyst is greatly increased. It is a further object of the present invention to provide a process of the above character which will permit the use of relatively strong sulfuric acid catalysts without concurrent hydration thereof by the water formed as the result of any side reactions.

The term "paraffins" or "paraffinic hydrocarbons" employed in the present specification and claims relates to the lower isoparaffinic members, namely, isobutane, isopentane and isohexanes. The rates of alkylation of these hydrocarbons, maintaining other conditions equal, are however not the same. Thus, the rate of alkymer formation when isopentane is employed is considerably slower than the rate of alkylation of isobutane, while the alkylation rate of isohexane is even lower. As to the terms "olefins" and "olefinic hydrocarbons," as used herein, they relate both to the normally gaseous olefins, which comprise the hydrocarbons between propylenes and pentenes, and to the normally liquid olefins, such as the hexenes and higher olefins. It is to be noted, however, that it is not desirable to employ very high boiling olefins since the alkylation reactions, more fully described hereinbelow, become unfavorable when such olefins are employed. Thus, it has been found that, in the case where normally liquid olefins are used to alkylate isoparaffins, it is preferable, although not absolutely necessary, to use fractions having not more than about twelve carbon atoms per molecule.

The above and other desirable objects may be attained by realizing the reaction between the described isoparaffinic hydrocarbons and the olefinic hydrocarbons in the presence of a catalytic agent comprising sulfuric acid and a suitable dehydrating agent adapted to react with any water present or formed during the catalytic alkylation reaction. Although any suitable dehydrating agent may be employed, the salts, and particularly the metallic salts of pyrosulphuric and pyrophosphoric acids are especially suitable. Thus, it is possible to use potassium pyrosulphate, sodium pyrosulphate, potassium pyrophosphate, sodium pyrophosphate, and the pyro sulphates and pyro phosphates of metals of the type of zinc, cadmium, mercury, silver, copper etc. In fact, it is frequently advantageous to employ the above metallic pyrosulphates and pyrophosphates because, in addition to their dehydrating characteristics, the metallic radicals of these salts are capable of enhancing the catalytic activity of the sulfuric acid catalyst.

The invention may, therefore, be stated to reside broadly in reacting isoparaffinic hydrocarbons of the type of isobutane, isopentane and isohexane, with normally gaseous or normally liquid olefinic hydrocarbons or with both types of olefins in the presence of a sulfuric acid catalyst containing a dehydrating agent. The invention still further resides in realizing the above reaction between the specified isoparaffins and olefinic hydrocarbons in the presence of a catalyst comprising strong sulfuric acid and containing a dehydrating agent adapted to remove any water present or formed during the reaction, thereby preventing the dilution of the sulfuric acid, increasing the active life of the alkylating catalyst, and causing the reaction between the isoparaffinic and olefinic hydrocarbons to form branched chain paraffinic hydrocarbons boiling within the gasoline range, possessing high anti-detonating characteristics and substantially free from polymers within the gasoline range. The invention still further resides in using the metallic pyrosulphates and pyrosulphates of sodium, potassium, cadmium, zinc, silver, mercury and copper as the dehydrating agent in the above described reaction.

In a more specific sense the invention resides in the treatment of the described isoparaffins with normally gaseous olefins above ethylene in the presence of a catalyst comprising strong sulfuric acid and a dehydrating agent of the type of pyrosulphates and pyrophosphates of the metals enumerated above, these metallic pyrosulphates and pyrophosphates acting as the dehydrating agent and simultaneously enhancing the catalytic activity of the sulfuric acid employed. The invention also resides in reacting isoparaffinic hydrocarbons having less than seven carbon atoms per molecule with normally liquid olefins, preferably below about dodecenes, in the presence of a catalyst mixture comprising strong sulfuric acid and the described dehydrating agent, whereby the products of the reaction comprise branched chain paraffinic hydrocarbons boiling within the gasoline range, having high anti-detonating characteristics and substantially free from products of polymerization within said gasoline range. The term "strong sulfuric acid" as employed herein refers to an acid having limited quantities of water, the $H_2SO_4$ concentration being above 85% and approaching 100% $H_2SO_4$ content.

The dehydrating agent may be added to the sulfuric acid catalyst before the interaction of the specified isoparaffinic and olefinic hydrocarbons. However, care should be taken that the quantity of the metallic pyrosulphate or pyrophosphate added is not excessive. It is to be remembered that the reaction between, for example, potassium pyrosulphate and water results in the formation of a substantially insoluble potassium acid sulphate, the reaction between the two substances being as follows:

$$K_2S_2O_7 + H_2O = 2KHSO_4$$

This acid sulphate if present in excessive quantities and because of its insolubility in strong sulfuric acid will form a pasty mass with this acid. As a consequence, the acid is rendered unsuitable for use as a catalytic material. To overcome this objection it is possible to add the pyrosulphate or pyrophosphate incrementally during the alkylation reaction, this gradual addition of the dehydrating agent preventing the dilution of the strong sulfuric acid by the water gradually formed as the result of any side reaction between the sulfuric acid and the hydrocarbons to be alkylated. Also, if desired, and for the purpose of preventing any undesirable adsorption of the sulfuric acid by the acid sulphate or acid phosphate formed as the result of the hydration of the above dehydrating agent, it may be possible or advantageous to withdraw continuously or intermittently portions of the sulfuric acid out of the sphere of reaction and to treat the withdrawn sulfuric acid to separate it form the acid phosphates and/or acid sulphates formed. The sulfuric acid thus refined may then be returned into the sphere of alkylation reaction.

In one of its preferred embodiments the invention includes the realization of the alkylating reaction substantially in the liquid phase. In this case it is preferable to maintain, during the whole course of the reaction, a concentration of isoparaffins in excess of the quantity theoretically necessary to combine with the olefins. For this purpose, the isoparaffins, such as isobutane, isopentane, isohexane or mixtures thereof may be first commingled with the catalyst mixture containing the strong sulfuric acid and the described dehydrating agent. The reaction may be realized at ordinary or room temperatures, such as 70° F. to 80° F. However, under certain conditions, it may be advisable to conduct the reaction at higher or lower temperatures. The pressures are such as will maintain the reacting hydrocarbons in a substantially liquid phase. The mixture of isoparaffins and alkylating catalyst should be preferably maintained in a state of agitation, the olefins being gradually introduced into this mixture. The presence of an excess of isoparaffins and the relatively gradual addition of the olefins prevents any local overconcentration of the olefins which would otherwise favor polymerization instead of alkylation of the isoparaffins. In other words, the constant presence of an excess of isoparaffinic molecules increases the chance of the contact of activated olefin with an activated isoparaffin molecule. Simultaneously, the relatively slow addition of the olefins decreases their concentration thus also increasing the possibility that the alkylation reaction will take place in preference to the polymerization of the olefins.

The following examples are prepared to show the advantages and improvements resulting from the addition of the above described dehydrating agents to the sulfuric acid catalyst employed for the interaction between the relatively low molecular weight isoparaffinic hydrocarbons and the described olefins. It is understood, however, that these examples are merely illustrative and are not to be considered as limiting the invention.

In these experiments the isoparaffinic fractions employed comprised a narrow cut obtained from the stabilization of natural gasoline, an analysis of this fraction indicating that it consisted of approximately 85% isobutane and 15% normal butane. It is obvious, however, that the isoparaffin fraction to be alkylated according to the present invention may consist of hydrocarbons other than isobutane, such as isopentane, or may comprise a mixture containing these and other isoparaffinic hydrocarbons.

The specific olefin containing gaseous fraction employed was derived from petroleum cracking operations. It contained approximately 49% of propylene and butylenes, the ratio of propylene to the butylenes being about 1:3.

All of the various runs were realized at a temperature of about 70° F., and a pressure of about 40 to 70 pounds per square inch gauge, this pressure being sufficient to conduct the reaction in the liquid phase. The procedure employed was substantially as follows: About 1800 grams of the above described isobutane-containing fraction was first commingled with 750 milliliters of the given catalyst, and about 200 grams of the olefin-containing fraction gradually conveyed to the reaction sphere or zone, the rate of olefin addition being about 3.0 milliliters of olefin per minute. During the reaction, the mixture was constantly maintained in a state of violent agitation. After all of the olefin stock had been added agitation was discontinued and the two phases were allowed to separate. Thereafter, the hydrocarbon phase was separately removed from the reactor while the acid catalyst was reused by repeating the cycle of operations described until the character of the hydrocarbon reaction product indicated that the catalyst had lost its activity.

In one of the runs the catalyst consisted of sulfuric acid of a 94% sulfuric content. This catalyst being used without the addition of any dehydrating agent. When this catalyst was employed for the purpose of alkylating in the manner described hereinabove, it was determined that approximately 2.7 volumes of a reaction product, containing approximately 22% of polymerized olefins, could be obtained for each volume of the sulfuric acid originally employed. The acid then losing its alkylating ability and causing excessive polymerization. On the other hand, when the alkylation of the same isoparaffinic fraction, with the above described olefin containing fraction, was conducted in the presence of a catalyst consisting of sulfuric acid of 98.1% sulfuric acid content, the alkylating ability of this acid catalyst was not exhausted until the reaction product comprised 8.0 volumes per volume of the acid catalyst. Also this reaction product contained only 6.0% by weight of polymers as compared to the 22% of polymerized olefins resulting from the use of 94% sulfuric acid.

As previously stated, one of the many reasons for the final loss in the alkylating activity of a given sulfuric acid catalyst is due to the formation of water. It is thus seen that when 98.1% sulfuric acid was employed as the catalyst the alkylating life of this catalyst was practically three times that of the 94% sulfuric acid. When a dehydrating agent, such as potassium pyrosulphate is used in connection with the 98.1% sulfuric acid, the catalytic life of the acid is enhanced because the water present, or formed in situ, reacts with the dehydrating agent to form, for example, the above mentioned potassium acid sulphate. The yield of the alkymers is thus increased while the olefin content of the alkymer fractions boiling within the gasoline range is also maintained at a relatively low percentage. Correspondingly better yields of alkymers boiling within the gasoline range are also obtainable when the described dehydrating agents are employed with sulfuric acid of other strengths.

The above disclosure is presented in connection with the alkylation of isoparaffins with olefins and emphasizes the simple addition of the relatively low molecular weight normally gaseous olefins to the specified isoparaffins. In addition it was discovered that in reacting the isoparaffins with normally liquid olefinic hydrocarbons the reaction product comprised a large proportion of saturated hydrocarbons of branched chain structure boiling substantially within the gasoline range. Such hydrocarbons evidently could be formed by an initial scission of at least one of the original reacting hydrocarbons into two or more hydrocarbons of lower molecular weight, and the subsequent reaction of these lower molecular weight hydrocarbons to produce isoparaffinic molecules. Or, this may be the result of simple addition of the introduced olefinic molecule to the isoparaffinic molecule followed by scission of the product. Specifically, the alkylation reaction might be termed "cracking alkylation" in order to distinguish it from the straight or simple addition of an olefin to an isoparaffin, as already described hereinabove. The "cracking alkylation" reaction, therefore, may be described as including the step of reacting olefin molecules with isoparaffin molecules to produce one or more paraffinic alkymers which have molecular weights of less than that which would be obtained providing the reaction were one of simple addition in which one olefinic molecule reacts with one isoparaffinic molecule to produce a branched chain saturated molecule having a molecular weight equal to the sum of the molecular weights of the reacting olefin and isoparaffin.

Therefore, it has also been discovered that the reaction between the isoparaffins and certain of the olefins (and particularly the normally liquid olefins) in the presence of the described catalyst comprising strong sulphuric acid and a dehydrating agent of the class described hereinabove, may result in both the simple alkylation of the isoparaffins by the olefins added, and in the cracking alkylation in which, as stated, alkymers are produced which have a lower molecular weight than would be obtained by simple addition of an isoparaffin to an olefin. The higher molecular weight olefins, as olefins above dodecenes, however, appear to be unsuitable to react effectively with the isoparaffins to form alkymers, the products of reaction, when using these high molecular weight olefins, containing excessive percentages of polymers boiling above the gasoline range.

The term "gasoline boiling range," as employed herein, refers to the average boiling range of fuels used in ordinary automobile engines. Generally speaking, such a gasoline has an initial boiling point of about 100° F., and a maximum or end point of around 425° F. The term "atmospheric pressure" refers to pressures in the neighborhood of that exerted by a column of mercury 760 mm. in height, while "atmospheric temperature" and "room temperature" relate to temperatures in the vicinity of 70° F. to 80° F.

In carrying out the invention, the apparatus used and the conditions of operation chosen in respect to temperature, pressure, proportions of reacting constituents, etc., may be varied to suit individual cases. Thus, although the alkylation reactions described herein were realized at substantially room temperature, under certain conditions lower or higher temperatures may be employed. Furthermore, the rate and manner of adding the olefin may be altered.

As many pertinent and widely different embodiments of the invention may be made by those skilled in the art without departing from the spirit and scope hereof, it is to be understood that there is no intention to be limited by specific embodiments disclosed herein except as defined in the appended claims.

I claim:

1. An alkylation process for producing motor fuel which comprises reacting isoparaffinic hydrocarbons having less than seven carbon atoms per molecule with olefinic hydrocarbons having more than two carbon atoms per molecule, in the presence of a catalyst containing strong sulfuric acid and a dehydrating agent, other than the alkylating catalyst, which is compatible with said catalyst.

2. In a process according to claim 1, wherein the dehydrating agent is a metallic salt of pyrosulfuric acid.

3. In a process according to claim 1, wherein the dehydrating agent is a metallic salt of pyrophosphoric acid.

4. An alkylation process for forming motor fuel substantially free from olefinic polymers, which comprises reacting isoparaffinic hydrocarbons having less than seven carbon atoms per molecule with olefinic hydrocarbons having more than two and less than thirteen carbon atoms per molecule, in the presence of a catalyst mixture comprising strong sulfuric acid and a dehydrating and activating agent, other than the alkylating catalyst, which is compatible with said catalyst.

5. In a process according to claim 4 wherein the reaction between the isoparaffinic and olefinic hydrocarbons is realized at substantially room temperatures and at pressures sufficient to maintain the reacting hydrocarbons substantially in a liquid state.

6. In a process according to claim 4, wherein the dehydrating agent is a metallic pyrosulfate.

7. In a process according to claim 4, wherein the dehydrating agent is potassium pyrosulfate.

8. An alkylation process of forming branched chain paraffinic hydrocarbons having high anti-detonating characteristics boiling substantially within the gasoline range which comprises reacting isoparaffinic hydrocarbons having less than seven carbon atoms per molecule with normally gaseous olefins having more than two carbon atoms per molecule in the presence of strong sulfuric acid and of a sufficient quantity of a dehydrating agent other than the alkylating catalyst, which is compatible with said catalyst, to remove the water from the sphere of reaction.

9. In a process according to claim 8, wherein the dehydrating agent is a metallic salt of pyrosulphuric acid.

10. In a process according to claim 8, wherein the dehydrating agent is gradually added during the reaction to combine with the water formed as a by-product during the said reaction.

11. A process of producing alkylated isoparaffinic hydrocarbons boiling within the gasoline range which comprises reacting low boiling isoparaffinic hydrocarbons with normally gaseous olefinic hydrocarbons above ethylene in the presence of a strong sulfuric acid catalyst, and adding potassium pyrosulphate to combine with the water formed during said reaction.

12. In a process according to claim 11, wherein the products formed as the result of the reaction between the water and the potassium pyrosulphate are removed from the sphere of alkylation reaction.

13. In a process according to claim 1 wherein the reaction is realized at normal temperatures and at pressures sufficient to maintain the hydrocarbons substantially in a liquid state.

14. A process of forming branched chain paraffinic hydrocarbons having high anti-detonating characteristics, boiling within the gasoline range and substantially free from products of polymerization boiling within said range which comprises commingling isoparaffinic hydrocarbons having less than seven carbon atoms per molecule with strong sulfuric acid, maintaining said mixture in a state of agitation, introducing into said mixture normally liquid olefinic hydrocarbons thereby causing the formation of said branched chain paraffinic hydrocarbons and introducing into said mixtures a dehydrating agent, other than the sulfuric acid, which is compatible with the sulfuric acid to cause a reaction between said dehydrating agent and the water formed as a result of side reactions between the hydrocarbons and the sulfuric acid, thereby removing said water from the sphere of reaction.

15. In a process according to claim 14, wherein the dehydrating agent is copper pyrosulfate.

ARTHUR L. BLOUNT.

CERTIFICATE OF CORRECTION.

Patent No. 2,225,544.  December 17, 1940.

ARTHUR L. BLOUNT.

It is hereby certified that error appears in the printed specification of the above numbered patent requiring correction as follows: Page 2, first column, line 50-51, for "pyrosulphates" read --pyrophosphates--; and second column, line 39, for the word "form" read --from--; and that the said Letters Patent should be read with this correction therein that the same may conform to the record of the case in the Patent Office.

Signed and sealed this 4th day of November, A. D. 1941.

(Seal)

Henry Van Arsdale,
Acting Commissioner of Patents.